(12) United States Patent
Liu et al.

(10) Patent No.: US 11,997,623 B2
(45) Date of Patent: May 28, 2024

(54) INFORMATION TRANSMISSION METHOD AND DEVICE (71) Applicant: VIVO MOBILE COMMUNICATION CO., LTD., Chang'an Dongguan (CN)

(72) Inventors: Siqi Liu, Chang'an Dongguan (CN); Zichao Ji, Chang'an Dongguan (CN); Shixiao Liu, Chang'an Dongguan (CN); Wei Jiang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 390 days.

(21) Appl. No.: 17/366,481

(22) Filed: Jul. 2, 2021

(65) Prior Publication Data
US 2021/0345264 A1  Nov. 4, 2021

Related U.S. Application Data (63) Continuation of application No. PCT/CN2019/124082, filed on Dec. 9, 2019.

(30) Foreign Application Priority Data

Jan. 4, 2019 (CN) .......................... 201910009121.5

(51) Int. Cl.
*H04W 72/30* (2023.01)
*H04W 56/00* (2009.01)
(52) U.S. Cl.
CPC ......... *H04W 56/001* (2013.01); *H04W 72/30* (2023.01)
(58) Field of Classification Search
CPC ... H04W 56/0015; H04W 4/40; H04W 92/18; H04W 56/002; H04W 76/14;
(Continued)

(56) References Cited

U.S. PATENT DOCUMENTS 10,602,467 B2 * 3/2020 Yoon .................... H04L 27/2613
2015/0271841 A1 9/2015 Yamada
(Continued)

FOREIGN PATENT DOCUMENTS

CN 105898856 A 8/2016
CN 106464553 A 2/2017
(Continued)

OTHER PUBLICATIONS

Extended European Search Report for related Application No. 19906783.6 reported on Feb. 7, 2022.
(Continued)

*Primary Examiner* — Joseph Arevalo
(74) *Attorney, Agent, or Firm* — von Briesen & Roper, s.c.

(57) ABSTRACT

An information transmission method and device are provided, and relate to the field of communications technologies, to resolve a problem that signaling overheads are relatively high in a resource scheduling process in a related technology. The method includes: sending first target information on a first target resource of a first sending device, where the first target resource is related to at least one of the following: M first modes of the first sending device, N first synchronization sources found by the first sending device, and indication information, the M first modes include at least one of the following: a second mode supported by the first sending device, and a current third mode of the first sending device, the indication information is used to indicate that the first sending device is within or outside coverage of a first target synchronization source, the first target synchronization source is at least one of the N first synchronization sources, and M and N are positive integers.

17 Claims, 2 Drawing Sheets

(58) Field of Classification Search
CPC ..... H04W 56/001; H04W 72/25; H04W 4/46; H04W 52/383; H04W 56/0025; H04W 72/20; H04W 4/70; H04W 52/0245; H04W 52/10; H04W 52/242; H04W 52/325; H04W 72/23; H04W 72/51; H04W 84/06; H04W 16/28; H04W 36/0069; H04W 36/125; H04W 4/023; H04W 4/06; H04W 4/44; H04W 4/60; H04W 48/12; H04W 48/16; H04W 52/281; H04W 52/367; H04W 52/38; H04W 56/00; H04W 56/0005; H04W 56/006; H04W 68/025; H04W 72/02; H04W 72/04; H04W 72/0446; H04W 72/0453; H04W 72/1263; H04W 72/21; H04W 72/40; H04W 72/541; H04W 72/542; H04W 72/56; H04W 74/002; H04W 76/27; H04W 8/005; H04W 8/22; H04W 8/24; H04W 84/005; H04W 88/04; H04W 88/06
USPC ................. 370/329, 503, 350, 351, 318, 311

See application file for complete search history.

(56) References Cited

U.S. PATENT DOCUMENTS

2017/0126306 A1    5/2017   Kim et al.
2017/0280406 A1*   9/2017   Sheng ..................... H04W 4/40
2019/0007918 A1*   1/2019   Feng ..................... H04W 56/00

FOREIGN PATENT DOCUMENTS

CN         108633048 A     10/2018
WO     2018151644 A1      8/2018

OTHER PUBLICATIONS

First Japanese Office Action related to Application No. 2021-539379 reported on Sep. 29, 2022.
Intel Corporation "Sidelink Synchronization for NR V2X Communication", Aug. 20-24, 2018, 3GPP TSG RAN WG1 Meeting #94, Gothenburg, Sweden, R1-1808695.
R2-1816981, WG2#104, "Overall Consideration on NR V2X resource allocation," Discussion notes, Nov. 12-16, 2018.
Office Action from Chinese Patent Office dated Oct. 21, 2020 in relation to application 201910009121.5.

* cited by examiner

INFORMATION TRANSMISSION METHOD AND DEVICE

This application is a continuation application of a PCT Application No. PCT/CN2019/124082 filed on Dec. 9, 2019, which claims priority to Chinese Patent Application No. 201910009121.5, filed with the China National Intellectual Property Administration on Jan. 4, 2019 and entitled "INFORMATION TRANSMISSION METHOD AND DEVICE", the disclosures of which is incorporated herein by reference in their entireties.

TECHNICAL FIELD

This application relates to the field of communications technologies, and in particular, to an information transmission method and device.

BACKGROUND

Currently, two resource scheduling modes are introduced into a new radio (NR) sidelink (sidelink): a scheduling mode (mode) 1 and a scheduling mode 2. The mode 2 is further divided into multiple sub-modes (submode): a mode 2a, a mode 2b, a mode 2c, and a mode 2d. A base station mainly schedules a mode 1 device corresponding to the mode 1 to be transmitted on the sidelink. No base station schedules a mode 2 device corresponding to the mode 2. For example, a mode 2d device may schedule another device to be transmitted on the sidelink.

However, in a scenario in which a receiving device receives information sent by multiple sending devices at a peer end, because resources corresponding to scheduling modes in a related resource scheduling mode may be the same, the receiving device needs to perform additional signaling interaction with the multiple sending devices at the peer end, to learn a device status of each receiving device at the peer end (for example, a synchronization source or a scheduling mode of the receiving device). Consequently, overall signaling overheads and a scheduling latency are increased.

SUMMARY

Embodiments of this application provide an information transmission method and device.

This application is implemented as follows:

According to a first aspect, an embodiment of this application provides an information transmission method, where the method is applied to a first sending device, and the method includes:
sending first target information on a first target resource of the first sending device; where
the first target resource is related to at least one of the following: M first modes of the first sending device, N first synchronization sources found by the first sending device, and indication information; and
the M first modes include at least one of the following: a second mode supported by the first sending device, and a current third mode of the first sending device, the indication information is used to indicate that the first sending device is within or outside coverage of a first target synchronization source, the first target synchronization source is at least one of the N first synchronization sources, and M and N are positive integers.

According to a second aspect, an embodiment of this application provides an information transmission method, where the method is applied to a receiving device, and the method includes:
receiving first target information from a first sending device on a first target resource; where
the first target resource is related to at least one of the following: M first modes of the first sending device, N first synchronization sources found by the first sending device, and indication information; and
the M first modes include at least one of the following: a second mode supported by the first sending device, and a current third mode of the first sending device, the indication information is used to indicate that the first sending device is within or outside coverage of a first target synchronization source, the first target synchronization source is at least one of the N first synchronization sources, and M and N are positive integers.

According to a third aspect, an embodiment of this application provides a first sending device, including:
a sending module, configured to send first target information on a first target resource of the first sending device; where
the first target resource is related to at least one of the following: M first modes of the first sending device, N first synchronization sources found by the first sending device, and indication information; and
the M first modes include at least one of the following: a second mode supported by the first sending device, and a current third mode of the first sending device, the indication information is used to indicate that the first sending device is within or outside coverage of a first target synchronization source, the first target synchronization source is at least one of the N first synchronization sources, and M and N are positive integers.

According to a fourth aspect, an embodiment of this application provides a receiving device, including:
a receiving module, configured to receive first target information from a first sending device on a first target resource; where
the first target resource is related to at least one of the following: M first modes of the first sending device, N first synchronization sources found by the first sending device, and indication information; and
the M first modes include at least one of the following: a second mode supported by the first sending device, and a current third mode of the first sending device, the indication information is used to indicate that the first sending device is within or outside coverage of a first target synchronization source, the first target synchronization source is at least one of the N first synchronization sources, and M and N are positive integers.

According to a fifth aspect, an embodiment of this application provides a sending device, including a processor, a memory, and a computer program that is stored in the memory and that can run on the processor, and when the computer program is executed by the processor, steps of the information transmission method in the first aspect are implemented.

According to a sixth aspect, an embodiment of this application provides a receiving device, including a processor, a memory, and a computer program that is stored in the memory and that can run on the processor, and when the computer program is executed by the processor, steps of the information transmission method in the second aspect are implemented.

According to a seventh aspect, an embodiment of this application provides a computer-readable storage medium, where the computer-readable storage medium stores a computer program, and when the computer program is executed by a processor, steps of the foregoing information transmission method are implemented.

In the embodiments of this application, a sending device may send first target information on a selected first target resource. Because the first target resource is related to at least one of M first modes of the sending device (including at least one of a mode supported by the sending device and a current mode of the sending device) and N first synchronization sources found by the sending device, a receiving device can learn a device status of the sending device based on the first target resource, and no additional signaling interaction is required, thereby reducing signaling overheads and improving communication efficiency and effectiveness.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The technical solutions provided in this application may be applied to various communications systems, for example, a 5G communications system, a future evolved system, or a plurality of communications fusion systems. There may be multiple application scenarios, for example, machine-to-machine (M2M), D2M, macro-micro communication, enhanced mobile broadband (eMBB), ultra-reliable and low latency communication (uRLLC), and massive machine type communication (mMTC). These scenarios include but are not limited to scenarios such as communication between terminal devices, communication between network devices, or communication between a network device and a terminal device. The embodiments of this application may be applied to communication between a network device and a terminal device in the 5G communications system, communication between terminal devices, or communication between network devices.

Figure 1:
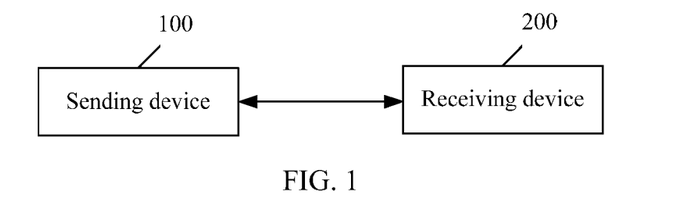
FIG. 1 is a possible schematic structural diagram of a communications system according to an embodiment of this application.

FIG. 1 is a possible schematic structural diagram of a communications system according to an embodiment of this application. As shown in FIG. 1, the communications system includes a sending device 100 and a receiving device 200.

In this embodiment of this application, the sending device 100 may be a network device, or may be a terminal device. In addition, the receiving device may be a network device, or may be a terminal device. This is not limited in this application.

The network device may be a base station, a core network device, a transmission and reception point (TRP), a relay station, an access point, or the like. The network device may be a base transceiver station (BTS) in a global system for mobile communications (GSM) or a code division multiple access (CDMA) network, may be an NB (NodeB) in wideband code division multiple access (WCDMA), or may be an eNB or an eNodeB (evolutional NodeB) in LTE. The network device may be alternatively a wireless controller in a cloud radio access network (CRAN) scenario. The network device may be alternatively a network device in the 5G communications system or a network device in the future evolved network. However, the use of words does not constitute a limitation on the embodiments of this application.

The terminal device may be a wireless terminal device or a wired terminal device. The wireless terminal device may be a device that provides voice and/or other service data connectivity for a user, a handheld device with a wireless communication function, a computing device, another processing device connected to a wireless modem, an in-vehicle device, a wearable device, a terminal device in a future 5G network, a terminal device in a future evolved PLMN network, or the like. The wireless terminal device may communicate with one or more core networks by using a radio access network (RAN). The wireless terminal device may be a mobile terminal device, such as a mobile phone (or referred to as a "cellular" phone) and a computer with a mobile terminal device. For example, the wireless terminal device may be a portable, pocket-sized, handheld, computer built-in, or in-vehicle mobile apparatus that exchanges voice and/or data with a radio access network, and/or a device such as a personal communication service (PCS) phone, a cordless phone, a session initiation protocol (Session Initiation Protocol, SIP) phone, a wireless local loop (WLL) station, or a personal digital assistant (PDA). The wireless terminal device may be alternatively a mobile device, user equipment (UE), a UE terminal device, an access terminal device, a wireless communications device, a terminal device unit, a terminal device station, a mobile station (Mobile Station), a mobile console (Mobile), a remote station (Remote Station), a remote terminal (Remote Terminal), a subscriber unit (Subscriber Unit), a subscriber station (Subscriber Station), a user agent (User Agent), a terminal device apparatus, or the like.

Two resource scheduling modes are introduced into an NR sidelink (sidelink): a mode 1 and a mode 2, where the mode 2 is further divided into multiple sub-modes (sub-mode): a mode 2a, a mode 2b, a mode 2c, and a mode 2d. A base station mainly schedules a mode 1 device corresponding to the mode 1 to be transmitted on the sidelink. No base station schedules a mode 2 device corresponding to the mode 2. For example, a mode 2d device may schedule another device to be transmitted on the sidelink.

Specifically, for specific scenarios of the mode 2a, the mode 2b, the mode 2c, and the mode 2d mentioned in this specification, refer to the following content:

The mode 2a: A device decodes received control information and/or measures signal strength on a resource and/or performs resource evaluation by using another determining method to determine resources that can be used, for example, a resource not occupied by a control information indication sent by another device and/or a resource with very low measured signal strength are/is considered to be available.

The mode 2b: A device sends information measured by the device or collected in some manner to another device. For example, the device sends some information related to a resource occupation status to the another device, to assist sidelink transmission of the another device.

The mode 2c: Some resources are defined in a protocol, or some resources are pre-configured by a manufacturer, or some resource configurations are obtained from a network configuration when a previous device is still covered. A device may directly use these resources, or may use some of these resources that meet a specific evaluation criterion after evaluation.

The mode 2d: A device schedules transmission of another device on a sidelink. For example, a device 1 schedules a device 2 to send a message to a device 3 on a specific resource. In this case, the device 1, the device 2, and the device 3 may be considered as being in the mode 2d. In this application, a scheduling device refers to a device used to indicate a resource for sidelink transmission of a scheduled device, that is, the device 1, and the device 2 is the scheduled device. The scheduling device, the scheduled device, and an object transmitted by the scheduled device on a sidelink may be considered as being in the mode 2d.

In related technologies, in a scenario in which a receiving device receives information sent by multiple sending devices at a peer end, because resources corresponding to scheduling modes in a resource scheduling mode may be the same, the receiving device needs to perform additional signaling interaction with the multiple sending devices at the peer end, to learn a device status of each receiving device at the peer end (for example, a synchronization source or a scheduling mode of the receiving device). Consequently, overall signaling overheads and a scheduling latency are increased.

For example, for the mode 2d, the scheduling device in the mode 2d may simultaneously schedule multiple devices (referred to as scheduled devices in this application). Different scheduled devices may select different synchronization sources, use different SLIDs, or maintain different synchronization information, and each scheduled device may send a synchronization sequence of the scheduled device. In this case, to ensure normal communication between a mode 2d device and the scheduled devices, the mode 2d device needs to separately detect these synchronization sequences and be separately synchronized with the scheduled devices. Consequently, signaling overheads and a scheduling latency of the mode 2d device are increased.

To resolve the foregoing problem, the embodiments of this application provide an information transmission method and device. A sending device may send first target information on a selected first target resource. Because the first target resource is related to at least one of M first modes of the sending device (including at least one of a mode supported by the sending device and a current mode of the sending device) and N first synchronization sources found by the sending device, a receiving device can learn a device status of the sending device based on the first target resource, and no additional signaling interaction is required, thereby reducing signaling overheads and improving communication efficiency and effectiveness.

It should be noted that "/" in this specification represents or. For example, A/B may represent A or B; "and/or" in this specification merely describes an association relationship of associated objects, and indicates that there may be three relationships. For example, A and/or B may represent that there are three cases: There is only A, there are both A and B, and there is only B.

It should be noted that, for ease of clearly describing the technical solutions in the embodiments of this application, in the embodiments of this application, the words "first", "second", and the like are used to distinguish between same or similar items with basically the same functions. A person skilled in the art may understand that the words "first", "second", and the like do not limit a quantity and an execution sequence.

For example, first target information and second target information are used to distinguish between different target information, and are not used to describe a specific sequence of the target information.

It should be noted that, in the embodiments of this application, words such as "exemplary" or "for example" are used to indicate an example, an instance, or descriptions. Any embodiment or design scheme described as "exemplary" or "an example" in the embodiments of this application should not be construed as being preferable or advantageous than other embodiments or design schemes. Specifically, the words such as "exemplary" or "for example" are used to present related concepts in a specific manner.

It should be noted that, in this embodiment of this application, "of (English: of)", "corresponding (English: corresponding, relevant)", and "corresponding (English: corresponding)" may be used in a mixed manner. It should be noted that, when a difference is not emphasized, meanings to be expressed by them are the same. In the embodiments of this application, "multiple" means two or more.

Figure 2:
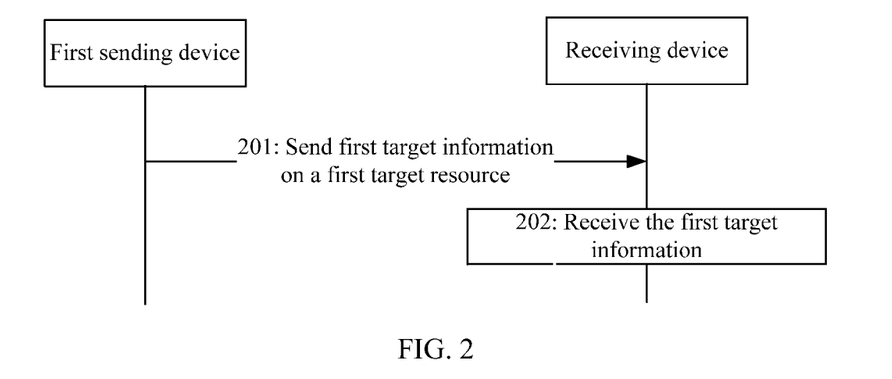
FIG. 2 is a schematic flowchart of an information transmission method according to an embodiment of this application.

FIG. 2 is a schematic flowchart of an information transmission method according to an embodiment of this application. As shown in FIG. 2, the information transmission method may include the following steps.

Step 201: A first sending device sends first target information on a first target resource of the first sending device.

Step 202: A receiving device receives the first target information from the first sending device on the first target resource.

In this embodiment of this application, the first target resource is related to at least one of the following: M first modes of the first sending device, N first synchronization sources found by the first sending device, and indication information. M and N are positive integers. For example, the N first synchronization sources include a direct synchronization source or an indirect synchronization source of the first sending device.

In this embodiment of this application, the indication information is used to indicate that the first sending device is within or outside coverage of a first target synchronization source, for example, within or outside coverage of a base station, or within or outside coverage of a global navigation satellite system (GNSS). The first target synchronization source is at least one of the N first synchronization sources. For example, the indication information may be dedicated information, that is, information that is only used to indicate that the first sending device is within or outside coverage of the first target synchronization source. Alternatively, the indication information may also be other related information (for example, a target signal sequence or an orthogonal code). In addition to its original function, the information further has a function of indicating that the first sending device is within or outside coverage of the first target synchronization source. For example, a sequence 1 is used to indicate that the first sending device is within coverage of the first target synchronization source, and a sequence 2 is used to indicate that the first sending device is outside coverage of the first target synchronization source.

In this embodiment of this application, the M first modes include at least one of the following: a second mode supported by the first sending device and a current third mode of the first sending device. Exemplarily, the first mode, the second mode, the third mode, and the following fourth mode may each include at least one of the following: a scheduling mode, a transmission mode, a service type, a user group, and the like. This is not limited in this embodiment of this application.

The transmission mode may include at least one of broadcast, multicast, and unicast.

The service type may include at least one of a public safety service (public safety), an emergency service (emergency), a basic V2X service, an advanced V2X service, a periodic service, an aperiodic service, and a semi-static service. The advanced V2X service includes an advanced V2X service, for example, at least one of vehicles platooning (vehicles platooning), extended sensors (extended sensors), advanced driving (advanced driving), and remote driving (remote driving).

In a subsequent embodiment, that the first mode is a scheduling mode is mainly used as an example for description. When the first mode is another case, such as a transmission mode, a service type, and a user group, this embodiment of this application is also applicable, and details are not described one by one.

For example, a sidelink service in an NR system is used as an example, and two scheduling modes are introduced: a mode 1 and a mode 2. The mode 2 is further divided into four types: a mode 2a, a mode 2b, a mode 2c, and a mode 2d. Generally, any device may be in one or more modes at the same time. For example, a device 1 is in the mode 2a and the mode 2b at the same time.

Optionally, in this embodiment of this application, the first target resource is at least one of first resources corresponding to the M first modes, one first mode corresponds to at least one first resource, and first resources corresponding to different first modes may be the same or may be different. This is not limited in this embodiment of this application.

In this embodiment of this application, a first resource of one first mode or one first synchronization source includes at least one of the following resources used to transmit a corresponding target signal: a resource pool, a carrier, a bandwidth part BWP (bandwidth part), a time domain resource, and a frequency domain resource.

This embodiment of this application may be applicable to a synchronization timing scenario, or may be applicable to a data transmission scenario. This is not limited in this embodiment of this application. For example, in the synchronization timing scenario, the first target information is synchronization timing information, the first resource is a synchronization resource, the target signal is a synchronization signal, and the target signal sequence is a synchronization signal sequence.

For example, the first target information is timing synchronization information, and the first resource is a synchronization resource.

If the mode 2d and the mode 2a correspond to different synchronization resources, and the mode 2b and the mode 2c correspond to different synchronization resources, synchronization resources of the mode 2a, the mode 2b, and the mode 2c are not differentiated. A device 1 sends a synchronization resource corresponding to the mode 2d, to declare that the device 1 volunteers to become mode 2d UE or desire to enter the mode 2d, and if another user detects the synchronization resource corresponding to the mode 2d, the another user knows that there is a user who volunteers (volunteer) to become the mode 2d UE or desires to enter the mode 2d. Alternatively, the device 1 sends a synchronization resource corresponding to the mode 2d, to declare that the device 1 is a mode 2d user, and if another user detects the synchronization resource corresponding to the mode 2d, the another user knows that there is a user who is performing the mode 2d nearby. Further, if a broadcast signal or a synchronization signal can indicate identifier-related information of the device 1, for example, the broadcast signal or the synchronization signal can indicate an identifier of the device 1 (for example, a group identifier or an identifier of the device 1), a receiving user may confirm the identifier-related information of the device 1 by decoding the broadcast signal or the synchronization signal. Further, if a synchronization sequence 1 is dedicated to the mode 2d user, if another user detects the synchronization sequence 1, the another user considers that there is the mode 2d user or that a user wants to become the mode 2d user or is performing the mode 2d, and the another user knows an identifier of the user by decoding the broadcast signal or the synchronization signal.

It should be noted that in this embodiment of this application, first resources of different first modes may be the same, or may be different. This is not limited in this application. For example, first resources of different first modes are different:

In a first example, different first modes correspond to different masks.

In a second example, the first sending device indicates an available synchronization resource of the first sending device by using N bits, and N1 bits in the N bits are used to determine whether it is a mode A. For example, the first sending device indicates an available synchronization resource by using 6-bit indication information. Example 1: When a value of highest 3 bits is 100, it explicitly or implicitly indicates that a user is performing the mode 2d. Example 2: When a value of lowest 3 bits is 010 to 100, it explicitly or implicitly indicates that a current user is performing the mode 2a. Example 3: When a value of 6 bits is 100010, it indicates that a current user is performing the mode 2a and the mode 2d at the same time.

For example, the first target resource may be determined by using at least the following four examples:

In a first possible example, the first target resource is a first resource corresponding to a current mode (that is, the foregoing third mode) of the first sending device.

For example, the first target information is timing synchronization information, and the first resource is a synchronization resource. If the mode 2d has a higher priority than the mode 2a, the mode 2c, and the mode 2d, for example, a priority of the mode 2d>priorities of the mode 2c, the mode 2a, and the mode 2b, transmission is separately performed on synchronization resources corresponding to the mode 2a and the mode 2d when the first sending device is performing the mode 2a and the mode 2d at the same time.

In a second possible example, the first target resource is related to priorities of the M first modes In a third possible example, the first target resource is related to priorities of the M first modes.

The first rule is: selecting a first resource of a first mode corresponding to a first target priority as the first target resource of the first sending device. For example, the first target priority is X highest priorities in the priorities of the M first modes, or Y lowest priorities in the priorities of the M first modes, or a priority indicated by another device (the another device herein may be a network device or another sidelink terminal or a road side unit (RSU)), or a predetermined priority in the priorities of the M first modes, where X and Y are positive integers. The preset priority may be predefined, may be specified in a protocol, or may be preconfigured by a manufacturer.

For example, the priorities of the M first modes include at least one of the following: priorities of the M first modes when the first sending device is a synchronization source, priorities of the M first modes when the first sending device schedules another device, priorities of the M first modes when the first sending device is scheduled, and priorities of the M first modes when the first sending device selects a sidelink resource.

For example, the first target information is timing synchronization information, and the first resource is a synchronization resource. If the mode 2d has a higher priority than the mode 2a, the mode 2c, and the mode 2d, for example, a priority of the mode 2d>priorities of the mode 2c, the mode 2a, and the mode 2b, when the first sending device performs (or supports) at least two of multiple different submodes (namely, the mode 2a, the mode 2b, the mode 2c, and the mode 2d) of the mode 2 at the same time, a synchronization resource corresponding to a mode with a high priority may be selected for transmission, for example, the device 1 performs the mode 2a and the mode 2d at the same time, and a synchronization resource corresponding to the mode 2d is used for transmission.

It should be noted that, in this embodiment of this application, first modes corresponding to a same first resource may have a same priority or may have different priorities, and this is not limited in this embodiment of this application; and first modes corresponding to different first resources may have a same priority or may have different priorities, and this is not limited in this embodiment of this application.

It should be noted that, in this embodiment of this application, the foregoing correspondence between the first mode and the priority and the foregoing correspondence between the first mode and the first resource may be configured for the first sending device by using a network, may be preconfigured by a manufacturer, may be predefined, may be specified in a protocol, may be indicated by another user to the first sending device, or may be notified by an upper layer.

In a fourth possible example, the first target resource is related to target signal sequences corresponding to the M first modes.

The first target resource is a first resource corresponding to a first target sequence, the first target sequence is at least one of target signal sequences corresponding to the M first modes, and one first mode corresponds to at least one target signal sequence.

For example, the first target sequence is related to the indication information, in other words, the first sending device may determine the first target sequence based on the indication information. The indication information is used to indicate that the first sending device is within or outside coverage of the first target synchronization source. The first target synchronization source is at least one of the N first synchronization sources.

Optionally, in this embodiment of this application, step 201 specifically includes the following step:

Step 201a: When M is a positive integer greater than 1, the first sending device sends, on the first target resource, first target information corresponding to some or all of the M first modes.

Correspondingly, a receiving device at a peer end receives, on the first target resource, the first target information corresponding to the some or all of the M first modes from the first sending device.

The some or all of the first modes include a target first mode corresponding to the first target resource.

For example, the first target information is timing synchronization information. If the first sending device performs at least two first modes at the same time or the first sending device supports at least two first modes at the same time, step 201a may be implemented by using at least the following three examples:

Example 1: The first sending device sends, on the first target resource, only timing synchronization information of the target first mode corresponding to the first target resource.

For example, the device 1 is performing transmission corresponding to the mode 2a and the mode 2d. The device 1 determines, based on priorities of the mode 2a and the mode 2d, that a synchronization resource of the mode 2d is an available resource. In this case, the device 1 may transmit timing synchronization information of the mode 2d on the synchronization resource corresponding to the mode 2d, that is, does not perform dedicated timing synchronization information transmission of the mode 2a. It may be considered that, in this case, timing synchronization information of the mode 2a directly uses the timing synchronization information of the mode 2d.

Example 2: The first sending device sends, on the first target resource, timing synchronization information of some of all ongoing first modes or all supported first modes.

For example, the device 1 is performing transmission corresponding to the mode 2a and the mode 2d. The device 1 determines, based on priorities of the mode 2a and the mode 2d, that a synchronization resource of the mode 2d is an available resource. In this case, the device 1 may transmit timing synchronization information of the mode 2a and the mode 2d on the synchronization resource corresponding to the mode 2d, or when synchronization resources corresponding to the mode 2a, the mode 2d, and the mode 2c at least partially overlap, the timing synchronization information of the mode 2a and the timing synchronization information of the mode 2d are transmitted at least in an overlapping part.

Example 3: The first sending device sends, on the first target resource, timing synchronization information of all ongoing first modes or all supported first modes.

For example, the device 1 is performing transmission corresponding to the mode 2a and the mode 2d. The device 1 determines, based on priorities of the mode 2a and the mode 2d, that a synchronization resource of the mode 2d is an available resource. In this case, the device 1 may transmit timing synchronization information of the mode 2a and the mode 2d on the synchronization resource corresponding to the mode 2d.

In this embodiment of this application, the first sending device may determine the first target resource based on the N first synchronization sources found by the first sending device, or may determine the first target resource based on a direct synchronization source of the first sending device, or may determine the first target resource based on an indirect synchronization source of the first sending device. Further, the target resource may be alternatively determined based on whether the first sending device within or outside coverage of the first target synchronization source. For example, different synchronization source types may correspond to different synchronization signal sequence IDs (SLID), and a user may determine a synchronization source of a current user by detecting the SLID.

A user covered by a base station on an LTE sidelink may use the base station as a synchronization source. On an NR sidelink, in addition to an LTE base station (eNB), an NR base station may also be used as a synchronization source. In addition, an RSU may also be used as a synchronization source. Therefore, the user may use an NW (network, network) as a synchronization source, where the NW may include at least one of the LTE base station, the NR base station, and the RSU.

For example, the N synchronization sources found by the first sending device are described below by using the following eight scenarios.

Scenario 1:
Synchronization source types in the scenario 1 (11 synchronization source types that may be found by the first sending device) include at least one of the following: a GNSS, an NW (network, network), UE 11 (a user directly synchronized with the NW), UE 12 (a user directly synchronized with the UE 11, or a user who is one hop away from being directly synchronized with the NW), UE 13 (another user directly synchronized with the NW, or a user who is more than one hop away from being directly synchronized with the NW), UE 14 (a user within coverage of a base station directly synchronized with the GNSS), UE 15 (a user outside coverage of a base station directly synchronized with the UE 14), UE 16 (a user outside coverage of a base station directly or indirectly synchronized with the UE 15), UE 17 (a user outside coverage of a base station directly synchronized with the GNSS), UE 18 (a user outside coverage of a base station directly or indirectly synchronized with the UE 17), and UE 19 (another user, including a user outside coverage of a base station that generates timing synchronization information based on a local clock and UE that uses the base station as a direct or indirect synchronization source).

Scenario 2:
Synchronization source types in the scenario 2 (eight synchronization source types that may be found by the first sending device) include at least one of the following: a GNSS, an NW, UE 21 (a user directly synchronized with the NW), UE 22 (a user directly or indirectly synchronized with UE 11, or a user who is at least one hop away from being directly synchronized with the NW), UE 23 (a user who is within coverage and is directly synchronized with the GNSS), UE 24 (a user who is outside coverage and is directly synchronized with the GNSS), UE 25 (a user who is outside coverage and is directly synchronized with the UE 24), and UE 26 (another user, including a user who is outside coverage and generates timing synchronization information based on a local clock and UE that uses the user as a direct or indirect synchronization source).

Scenario 3:
Synchronization source types in the scenario 3 (seven synchronization source types that may be found by the first sending device) include at least one of the following: a GNSS, an NW, UE 31 (a user directly synchronized with the NW), UE 32 (a user directly or indirectly synchronized with UE 31, or a user who is at least one hop away from being directly synchronized with the NW), UE 33 (a user directly synchronized with the GNSS), UE 34 (a user who is outside coverage and is directly synchronized with the UE 33), and UE 35 (another user, including a user who is outside coverage and generates timing synchronization information based on a local clock and UE that uses the user as a direct or indirect synchronization source).

Scenario 4:
Synchronization source types in the scenario 4 (six synchronization source types that may be found by the first sending device) include at least one of the following: a GNSS, an NW, UE 41 (a user directly synchronized with the NW), UE 42 (a user directly synchronized with the GNSS), UE 43 (a user indirectly synchronized with the NW or indirectly synchronized with the GNSS), and UE 44 (another user, including a user who is outside coverage and generates timing synchronization information based on a local clock and UE that uses the user as a direct or indirect synchronization source).

Scenario 5:
Synchronization source types in the scenario 5 (six synchronization source types that may be found by the first sending device) include at least one of the following: a GNSS, an NW, UE 51 (a user directly synchronized with the NW), UE 52 (a user directly synchronized with the GNSS), UE 53 (a user indirectly synchronized with the NW or indirectly synchronized with the GNSS), and UE 54 (another user, including a user who is outside coverage and generates timing synchronization information based on a local clock and UE that uses the user as a direct or indirect synchronization source).

Scenario 6:
Synchronization source types in the scenario 6 (five synchronization source types that may be found by the first sending device) include at least one of the following: a GNSS, an NW, UE 61 (a user directly synchronized with the NW), UE 62 (a user within coverage of a base station directly synchronized with the GNSS), and UE 63 (another user, including users outside coverage of all base stations, a user indirectly synchronized with the NW and a user indirectly synchronized with the GNSS, a user outside coverage of a base station directly synchronized with the GNSS, a user who is outside coverage and generates timing synchronization information based on a local clock and UE that uses the user as a direct or indirect synchronization source).

Scenario 7:
Synchronization source types in the scenario 7 (six synchronization source types that may be found by the first sending device) include at least one of the following: a GNSS, an NW, UE 71 (a user directly synchronized with the NW), UE 72 (a user who is outside coverage and is directly synchronized with the GNSS), UE 73 (a user who is outside coverage and is directly synchronized with the GNSS), and UE 74 (another user, including a user who is outside coverage and generates timing synchronization information based on a local clock and UE that uses the user as a direct or indirect synchronization source, and a user indirectly synchronized with the NW or indirectly synchronized with the GNSS).

Scenario 8:
Synchronization source types in the scenario 8 (three synchronization source types that may be found by the first sending device) include at least one of the following: a GNSS, an NW, and UE 83 (another user, including a user who meets a requirement and sends synchronization information).

Further, the first sending device determines the first target resource with reference to information about whether the first sending device is within coverage of the base station.

In a manner, if the synchronization source is an NW, the synchronization source corresponds to a resource set A; if the synchronization source is a GNSS and is within coverage of a base station, the synchronization source corresponds to a resource set B; if the synchronization source is a GNSS and is outside coverage, the synchronization source corresponds to a resource set C; and if the synchronization source is another user, the synchronization source corresponds to a resource set D, where one resource set includes at least one resource.

In another implementation, if the synchronization source is an NW, the synchronization source corresponds to a synchronization sequence ID set A; if the synchronization source is a GNSS and is within coverage of a base station, the synchronization source corresponds to a synchronization sequence ID set B; if the synchronization source is a GNSS and is outside coverage, the synchronization source corresponds to a synchronization sequence ID set C; and if the synchronization source is another user, the synchronization source corresponds to a synchronization sequence ID set D. One synchronization sequence ID set includes at least one synchronization sequence ID. The two implementations may be performed together, or implemented separately.

In the foregoing eight scenarios, each synchronization source type found by the first sending device may include one or more synchronization source entities. For example, in the scenario 1, multiple devices are directly synchronized with an NW, and all the devices belong to the synchronization source type of UE 11.

Optionally, in this embodiment of this application, the method further includes the following step:

Step 201b: The first sending device sends a second target sequence on the first target resource of the first sending device.

Correspondingly, the receiving device at the peer end receives the second target sequence from the first sending device on the first target resource.

The first target information is carried on the second target sequence, or the first target information is carried on the second target sequence and a physical sidelink broadcast channel (PSBCH). The second target sequence is at least one of target signal sequences corresponding to the M first modes, and one first mode corresponds to at least one target signal sequence.

For example, the first target sequence is related to the indication information, and the indication information is used to indicate that the first sending device is within or outside coverage of the first target synchronization source. The first target synchronization source is at least one of the N first synchronization sources.

For example, the second target sequence is related to priorities of the M first modes.

For example, the second target sequence is related to priorities of the M first modes and a second rule, and the second rule is: selecting a target signal sequence of a first mode corresponding to a second target priority as the second target sequence of the first sending device.

For example, the second target priority is A highest priorities in the priorities of the M first modes, or B lowest priorities in the priorities of the M first modes, or a priority indicated by another device in the priorities of the M first modes, or a preset priority in the priorities of the M first modes, where A and B are positive integers. The preset priority may be predefined, may be specified in a protocol, or may be preconfigured by a manufacturer.

Optionally, in this embodiment of this application, step 201 specifically includes the following step:

Step 201c: The first sending device sends a target signal based on a target code on the first target resource of the first sending device.

Correspondingly, the receiving device at the peer end receives the target signal from the first sending device on the first target resource.

The target signal carries the first target information, the target code is at least one of first codewords corresponding to the M first modes, one first mode corresponds to at least one first codeword, and the at least one first codeword includes at least one of the following: a mask, a phase rotation, and an orthogonal code.

It should be noted that the target signal may be alternatively a target signal sequence, that is, the first sending device may send the target signal sequence on the first target resource based on the target code.

For example, in CDM, the first target information is timing synchronization information and the first resource is a synchronization resource. The first sending device supports synchronization sequences of at least two ports. Different ports correspond to different modes. An implementation form of multiple ports is: N single ports are implemented in at least one of CDM (code division multiplexing), TDM (time division multiplexing), and FDM (frequency division multiplexing). In an implementation of CDM, a time domain orthogonal code (OCC) and a frequency domain OCC orthogonal code are used, that is, different modes correspond to different orthogonal codes.

For example, the device 1 is performing the mode 2a and the mode 2d at the same time, synchronization sequences corresponding to the mode 2a and the mode 2d are simultaneously transmitted on available time-frequency resources, and orthogonality between the two sequences is ensured by using OCC. If the receiving device is a device scheduled by the device 1, a sequence corresponding to the mode 2d and/or OCC are/is related to a receive signal; and if the receiving device is not a scheduled user, a sequence corresponding to the mode 2a and/or OCC are/is related to a receive signal.

For example, the target code may be determined by using at least the following five examples:

In a first possible example, the target code is a first codeword corresponding to the current mode (that is, the foregoing third mode) of the first sending device.

In a second possible example, the target code is related to priorities of the M first modes.

In a third possible example, the target code is related to priorities of the M first modes and a third rule.

The third rule is: selecting a first codeword of a first mode corresponding to a third target priority as the target code of the first sending device. For example, the third target priority is C highest priorities in the priorities of the M first modes, or D lowest priorities in the priorities of the M first modes, or a priority indicated by another device in the priorities of the M first modes, or a preset priority in the priorities of the M first modes, where C and D are positive integers. The preset priority may be predefined, may be specified in a protocol, or may be preconfigured by a manufacturer.

For example, the priorities of the M first modes include at least one of the following: priorities of the M first modes when the first sending device is a synchronization source, priorities of the M first modes when the first sending device schedules another device, priorities of the M first modes when the first sending device is scheduled, and priorities of the M first modes when the first sending device selects a sidelink resource.

It should be noted that the first target priority, the second target priority, and the third target priority may be a same priority, or may be different priorities. This is not limited in this application.

In the information transmission method provided in this embodiment of this application, a sending device may send first target information on a selected first target resource. Because the first target resource is related to at least one of M first modes of the sending device (including at least one of a mode supported by the sending device and a current mode of the sending device) and N first synchronization sources found by the sending device, a receiving device can learn a device status of the sending device based on the first target resource, and no additional signaling interaction is required, thereby reducing signaling overheads and improving communication efficiency and effectiveness.

For the receiving device, optionally, in this embodiment of this application, the method further includes the following step:

Step A1: The receiving device obtains third information from the sending device based on the first target resource.

The first target resource is used to indicate the third information of the sending device.

For the receiving device, optionally, in this embodiment of this application, the method further includes the following step:

Step A2: The receiving device obtains third information from the sending device based on a second target sequence.

The second target sequence is used to indicate the third information of the sending device.

For example, the third information includes at least one of the following information: a synchronization source of the sending device, a mode of the sending device, a mode expected to be used by the sending device, and a priority of the sending device.

For example, in this embodiment of this application, the receiving device may determine a current status (that is, the foregoing third information) of the sending device based on the first target resource and the second target sequence. In other words, the first target resource may directly or indirectly indicate the third information, and the second target sequence may directly or indirectly indicate the third information.

For example, after receiving the second target sequence, the receiving device may determine the third information based on the second target sequence.

For example, the first target information is timing synchronization information, the first resource is a synchronization resource, and the sequence is a synchronization signal sequence. Each first mode corresponds to at least one synchronization signal sequence. It is assumed that an index of a synchronization signal sequence corresponding to a mode A is denoted as id_A, and a value range is a subset of a range X to (X+M−1); an index of a synchronization signal sequence corresponding to a mode B is denoted as id_B, and a value range is a subset of a range Y to (Y+N−1); and an index of a synchronization signal sequence corresponding to a mode C is denoted as id_C, and a value range is a subset of a range Z to (Z+O−1). If the user performs at least two modes at the same time, and a label of a corresponding synchronization sequence is denoted as id, id may be represented as a function of id_A, id_B, and id_C, for example, id=f (id_A, id_B, id_C). The following D is an integer.

Example 1: An index id is located in a set {id_A*M*N+ id_B*N+id_C+D}. In this case, the id is decomposed through conversion to determine a mode constituting this combination.

If D=0,
id_1=floor(id/(M*N));
id_2=floor((id−id_1*M*N)/N);
id_3=(id−id_1*M*N−id_2*N).

Value ranges of id_1, id_2, and id_3 are determined, to determine a current mode. If id_2 and id_1 are respectively among candidate values of id_B and id_A and id_3 is not among candidate values of id_C, it is determined that a current user is performing a mode A and a mode B at the same time.

Example 2: An index id is located in a set {id_A*O*N+ id_B*0+id_C+D}. In this case, the id is decomposed through conversion to determine a mode constituting this combination.

If D=0,
id_1=floor(id/(O*N));
id_2=floor((id−id_1*O*N)/O);
Id_3=(id−id_1*O*N−id_2*O).

Value ranges of id_1, id_2, and id_3 are determined, to determine a current mode. If id_2 and id_1 are among candidate values of id_B and id_A and id_3 is not among candidate values of id_C, it is determined that a current user is performing a mode A and a mode B at the same time.

For the receiving device, optionally, in this embodiment of this application, the method further includes the following step:

Step B1: The receiving device separately receives at least one piece of second target information from at least one second sending device on J second target resources.

Any second target resource in the J second target resources is related to at least one of the following of a second sending device corresponding to the any second target resource: at least one fourth mode of the second sending device, K second synchronization sources found by the second sending device, and fifth information corresponding to the second sending device. Because one second target resource corresponds to one or more second sending devices, the foregoing any second target resource may correspond to one or more second sending devices. The fifth information is used to indicate that the second sending device is within or outside coverage of a second target synchronization source. The second target synchronization source is at least one of the K second synchronization sources. The at least one fourth mode includes at least one of the following: a mode supported by the second sending device and a current mode of the second sending device, where J and K are positive integers.

For example, the K second synchronization sources include a direct synchronization source or an indirect synchronization source of the second sending device.

In this embodiment of this application, a first resource of one second mode or one second synchronization source includes at least one of the following resources used to transmit a corresponding target signal: a resource pool, a carrier, a BWP, a time domain resource, and a frequency domain resource.

It should be noted that the second sending device may find one or more synchronization source types, and one synchronization source type may include one or more synchronization source entities (that is, the second synchronization source).

It should be noted that the fifth information is similar to the foregoing indication information. For related explanations, refer to the foregoing descriptions, and details are not described herein again.

It should be noted that a process of sending the second target information by the J second sending devices is similar to a process of sending the first target information by the first sending device. Therefore, for a process in which the second sending device selects the second target resource, details are not described again in this application.

Further optionally, with reference to step B1, the method further includes the following step:

Step B2: The receiving device determines a synchronization source of the receiving device based on the third target resource.

The third target resource is at least one of the first target resource and the J second target resources.

For example, the third target resource is related to priorities of G target modes, and the G target modes include at least one of the following: a target first mode corresponding to the first target resource and a target second mode corresponding to each second target resource in the J second target resources.

For another example, the third target resource is related to priorities of the G target modes and a fourth rule, and the fourth rule is: selecting a resource corresponding to a target mode corresponding to a fourth target priority as the third target resource.

The fourth target priority is I highest priorities in the priorities of the G target modes, or S lowest priorities in the priorities of the G target modes, or a priority indicated by another device, or a preset priority in the priorities of the G target modes, where I and S are positive integers.

For example, the first target information is timing synchronization information, and the first resource is a synchronization resource. After selecting one or more synchronization resources from synchronization resources corresponding to the multiple pieces of received timing synchronization information, the receiving device may use, as a synchronization source, timing synchronization information obtained on the synchronization resource, or may use, as sending synchronization timing of the receiving device, timing synchronization information obtained on the synchronization resource.

Further optionally, with reference to step B1, the method further includes the following step:

Step B3: The receiving device sends third target information based on a fourth target resource.

The fourth target resource is at least one of the first target resource and the J second target resources.

For example, the fourth target resource is related to priorities of L target modes, and the L target modes include at least one of the following: a target first mode corresponding to the first target resource and a target second mode corresponding to each second target resource in the J second target resources, where L is a positive integer.

For another example, the fourth target resource is related to priorities of the L target modes and a fifth rule, and the fifth rule is: selecting a resource corresponding to a target mode corresponding to a fifth target priority as the fourth target resource.

The fifth target priority is H highest priorities in the priorities of the L target modes, or F lowest priorities in the priorities of the L target modes, or a priority indicated by another device in the priorities of the L target modes, or a preset priority in the priorities of the L target modes, where H and F are positive integers.

For example, the priority of the target mode includes at least one of the following: a priority of the target mode when a corresponding sending device is a synchronization source, a priority of the target mode when a corresponding sending device schedules another device, a priority of the target mode when a corresponding sending device is scheduled, and a priority of the target mode when a corresponding sending device selects a sidelink resource.

For example, the first target information is timing synchronization information, and the first resource is a synchronization resource. After selecting one or more synchronization resources (that is, selected synchronization resources) from synchronization resources corresponding to the multiple pieces of received timing synchronization information, the receiving device may determine, based on the synchronization resource and/or a synchronization signal detected on the synchronization resource, a synchronization resource used by the receiving device, and then send timing synchronization information based on the synchronization resource used by the receiving device. For example, the receiving device may use and send a synchronization signal sequence that is the same as the selected synchronization resource, or the receiving device derives, based on a synchronization signal sequence that is the same as the selected synchronization resource, a synchronization sequence of the receiving device that is used for sending and then sends the synchronization sequence, or may use an available synchronization resource synchronized with the selected synchronization resource to send a synchronization signal sequence.

It should be noted that the third target resource and the fourth target resource may be a same resource, or may be different resources. This is not limited in this embodiment of this application.

Further, step B3 may specifically include the following content:

Step B31: If the receiving device is a related device in the target mode, the receiving device does not send a target signal sequence.

Or

Step B32: If the receiving device is a non-related device in the target mode, the receiving device sends the third target information.

For example, when it is detected that a synchronization resource transmit end is a mode 2d scheduling user, if the receiving device is a mode 2d scheduled user, the receiving device does not send the synchronization signal sequence and/or a broadcast channel and/or an RS; and if the receiving device is not a mode 2d scheduled user, the receiving device sends the synchronization signal sequence and/or the broadcast channel and/or the RS.

For example, if the receiving device is a non-related device in the target mode, the receiving device sends the third target information based on the fourth target resource, where the fourth target resource is a resource other than the third target resource.

For example, the related device refers to a device related to transmission corresponding to the target mode, and the non-related device refers to a device unrelated to transmission corresponding to the target mode. Being related may refer to whether it is related to determining of a scheduling resource in the mode, and/or whether it is related to scheduling transmission of the mode, for example, corresponding to the mode 2d, the mode 2d scheduling user, the mode 2d scheduled user, and a target receiving device of the mode 2d scheduled user may be related devices of the mode 2d. In this case, if there is no relationship between transmission of a device that performs transmission based on another mode is an unrelated device of the mode 2d and transmission of the mode 2d, the device is an unrelated device of the mode 2d. For another example, corresponding to the mode 2b, a device 1 collects resource information and send the resource information to a device 2 to assist transmission of the device 2 on a sidelink, and both the device 1 and the device 2 may be considered as related devices of the mode 2b. In this case, if there is no relationship between transmission of a user who performs transmission based on another mode and transmission of the mode 2b or auxiliary information in the mode 2b is not used, the user is a non-related device of the mode 2d.

For example, the first target information is timing synchronization information, and the first resource is a synchronization resource.

Example 1: If the mode 2d has a higher priority than the mode 2a, the mode 2c, and the mode 2d, for example, a priority of mode 2d>priorities of the mode 2c, the mode 2a, and the mode 2b.

(1) It is assumed that the receiving device detects synchronization resources of multiple different submodes of the mode 2, a mode 2d scheduling user may be selected as a synchronization source and timing synchronization information is used.

Further optionally, if the receiving device detects synchronization resources of multiple different submodes of the mode 2, including a synchronization resource of a mode 2d scheduling user of the receiving device, when the receiving device is a scheduled user, the mode 2d scheduling user may be selected as a synchronization source and timing synchronization information is used for synchronization; and when the receiving device is not a scheduled user, priority information may be ignored and selected from synchronization resources of all submodes of the mode 2 detected to meet a requirement.

(2) The mode 1 has a higher synchronization source priority than the mode 2. The mode 2d has a higher synchronization source priority than other submodes of the mode 2. For example, the mode 1>the mode 2d>(the mode 2c, the mode 2a, the mode 2b). It is assumed that the receiving device detects synchronization resources of multiple modes 1 that meet a requirement and different submodes of the mode 2, a mode 1 user who meets the requirement may be selected as a synchronization source and timing synchronization information is used.

Further optionally, if the receiving device detects synchronization resources of multiple modes 1 and different submodes of the mode 2, when the receiving device is a mode 2d scheduled user and a mode 1 non-related user, priority information may be ignored, the mode 2d scheduling user may be selected as a synchronization source, and timing synchronization information is used for synchronization; and when the receiving device is not a mode 2d scheduled user, a mode 1 user who meets a requirement may be selected as a synchronization source and timing synchronization information may be used. If a mode 1 user who meets a requirement cannot be found, priority information may be ignored and may be selected from synchronization resources of different submodes of the mode 2 detected to meet the requirement.

Example 2: If the receiving device detects a synchronization resource corresponding to the mode 2d and is used as a synchronization source, the receiving device may no longer send the synchronization signal sequence when a receive end is a mode 2d scheduled user. When the receiving device is not a mode 2d scheduled user, the receiving device selects a resource from available synchronization resources other than the detected synchronization resource to send a synchronization signal. Further optionally, a sent SLID is the same as a detected SLID.

It should be noted that specific values of X, Y, A, B, C, and D in priority definitions described in this specification may be flexibly set based on an actual application scenario, and X, Y, A, B, C, and D may be the same or different. This is not limited in this embodiment of this application. Similarly, specific values of the quantities G and L of target modes described in this specification may be the same, or may be different.

According to the information transmission method provided in this embodiment of this application, after the receiving device receives the first target information on the first target resource, because the first target resource is related to at least one of the indication information, the M first modes of the first sending device, and the N first synchronization sources found by the sending device, the receiving device can learn a device status of the sending device based on the first target resource, and no additional signaling interaction is required, thereby reducing signaling overheads and improving communication efficiency and effectiveness.

Figure 3:
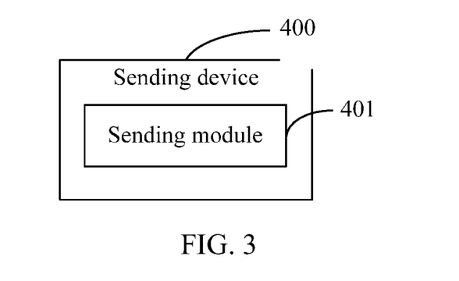
FIG. 3 is a schematic structural diagram 1 of a first sending device according to an embodiment of this application.

FIG. 3 is a possible schematic structural diagram of a sending device according to an embodiment of this application. As shown in FIG. 3, the sending device 400 includes a sending module 401.

The sending module 401 is configured to send first target information on a first target resource of the first sending device 400.

The first target resource is related to at least one of the following: M first modes of the first sending device 400, N first synchronization sources found by the first sending device 400, and indication information. The M first modes include at least one of the following: a second mode supported by the first sending device 400 and a current third mode of the first sending device 400. The indication information is used to indicate that the first sending device 400 is within or outside coverage of a first target synchronization source. The first target synchronization source is at least one of the N first synchronization sources. M and N are positive integers.

Optionally, the first target resource is at least one of first resources corresponding to the M first modes, and one first mode corresponds to at least one first resource.

Optionally, the first target resource is a first resource corresponding to the third mode.

Optionally, the first target resource is related to priorities of the M first modes.

Optionally, the first target resource is related to priorities of the M first modes and a first rule, and the first rule is: selecting a first resource of a first mode corresponding to a first target priority as the first target resource of the first sending device 400. The first target priority is X highest priorities in the priorities of the M first modes, or Y lowest priorities in the priorities of the M first modes, or a priority indicated by another device, or a preset priority, where X and Y are positive integers.

Optionally, the first target resource corresponds to a first resource corresponding to a first target sequence, the first target sequence is at least one of target signal sequences corresponding to the M first modes, and one first mode corresponds to at least one target signal sequence.

Optionally, the sending module 401 is specifically configured to: when M is a positive integer greater than 1, send, on the first target resource, first target information corresponding to some or all of the M first modes, where the some or all of the first modes include a target first mode corresponding to the first target resource.

Optionally, the sending module 401 is specifically configured to send a second target sequence on the first target resource of the first sending device 400. The first target information is carried on the second target sequence, or the first target information is carried on the second target sequence and a PSBCH. The second target sequence is at least one of target signal sequences corresponding to the M first modes, and one first mode corresponds to at least one target signal sequence.

Optionally, the second target sequence is related to priorities of the M first modes.

Optionally, the second target sequence is related to priorities of the M first modes and a second rule, and the second rule is: selecting a target signal sequence of a first mode corresponding to a second target priority as the second target sequence of the first sending device 400. The second target priority is A highest priorities in the priorities of the M first modes, or B lowest priorities in the priorities of the M first modes, or a priority indicated by another device, or a preset priority in the priorities of the M first modes, where A and B are positive integers.

Optionally, the second target sequence is related to the indication information.

Optionally, the sending module is specifically configured to send a target signal on the first target resource based on a target code, where the target signal carries the first target information, the target code is at least one of first codewords corresponding to the M first modes, one first mode corresponds to at least one first codeword, and the at least one first codeword includes at least one of the following: a mask, a phase rotation, and an orthogonal code.

Optionally, the target code is a first codeword corresponding to the third mode.

Optionally, the target code is related to priorities of the M first modes.

Optionally, the target code is related to priorities of the M first modes and a third rule, and the third rule is: selecting a first codeword of a first mode corresponding to a third target priority as the target code of the first sending device 400. The third target priority is C highest priorities in the priorities of the M first modes, or D lowest priorities in the priorities of the M first modes, or a priority indicated by another device, or a preset priority in the priorities of the M first modes, where C and D are positive integers.

Optionally, the priorities of the M first modes include at least one of the following: priorities of the M first modes when the first sending device 400 is a synchronization source, priorities of the M first modes when the first sending device 400 schedules another device, priorities of the M first modes when the first sending device 400 is scheduled, and priorities of the M first modes when the first sending device 400 selects a sidelink resource.

Optionally, a first resource of one first mode or one synchronization source includes at least one of the following resources used to transmit corresponding first target information: a resource pool, a carrier, a BWP, a time domain resource, and a frequency domain resource.

Optionally, the first target resource is used to indicate third information of the first sending device 400, and the third information includes at least one of the following information: a synchronization source of the first sending device 400, a mode of the first sending device 400, a mode expected to be used by the first sending device 400, and a priority of the first sending device 400.

Optionally, the second target sequence is used to indicate third information of the first sending device 400, and the third information includes at least one of the following information: a synchronization source of the first sending device 400, a mode of the first sending device 400, a mode expected to be used by the first sending device 400, and a priority of the first sending device 400.

According to the sending device provided in this embodiment of this application, the sending device may send first target information on a selected first target resource. Because the first target resource is related to at least one of M first modes of the sending device (including at least one of a mode supported by the sending device and a current mode of the sending device) and N first synchronization sources found by the sending device, a receiving device can learn a device status of the sending device based on the first target resource, and no additional signaling interaction is required, thereby reducing signaling overheads and improving communication efficiency and effectiveness.

The sending device provided in this embodiment of this application can implement the process in the foregoing method embodiment. To avoid repetition, details are not described herein again.

Figure 4:
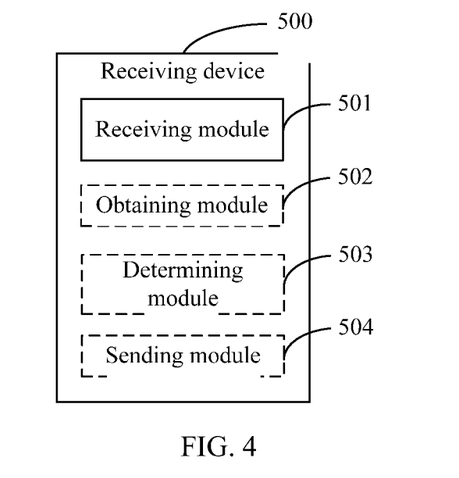
FIG. 4 is a schematic structural diagram 1 of a receiving device according to an embodiment of this application.

FIG. 4 is a possible schematic structural diagram of a receiving device according to an embodiment of this application. As shown in FIG. 4, the receiving device 500 includes a receiving module 501.

The receiving module 501 is configured to receive first target information from a first sending device on a first target resource.

The first target resource is related to at least one of the following: M first modes of the first sending device, N first synchronization sources found by the first sending device, and indication information. The M first modes include at least one of the following: a second mode supported by the first sending device and a current third mode of the first sending device. The indication information is used to indicate that the first sending device is within or outside coverage of a first target synchronization source. The first target synchronization source is at least one of the N first synchronization sources. M and N are positive integers.

Optionally, the first target resource is at least one of first resources corresponding to the M first modes, and one first mode corresponds to at least one first resource.

Optionally, the first target resource is a first resource corresponding to the third mode.

Optionally, the first target resource is related to priorities of the M first modes.

Optionally, the first target resource corresponds to a first resource corresponding to a first target sequence, the first target sequence is at least one of target signal sequences corresponding to the M first modes, and one first mode corresponds to at least one target signal sequence.

Optionally, the receiving module 501 is specifically configured to: when M is a positive integer greater than 1, receive, on the first target resource, first target information corresponding to some or all of the M first modes, where the some or all of the first modes include a target first mode corresponding to the first target resource.

Optionally, the receiving module 501 is specifically configured to receive a second target sequence from the first sending device on the first target resource. The first target information is carried on the second target sequence, or the first target information is carried on the second target sequence and a PSBCH. The second target sequence is at least one of target signal sequences corresponding to the M first modes, and one first mode corresponds to at least one target signal sequence.

Optionally, the second target sequence is related to priorities of the M first modes.

Optionally, the second target sequence is related to the indication information, the indication information is used to indicate that the first sending device is within or outside coverage of the first target synchronization source, and the first target synchronization source is at least one of the N first synchronization sources.

Optionally, the receiving module 501 is specifically configured to receive a target signal from the first sending device on the first target resource, where the target signal is sent by the first sending device based on a target code, the target signal carries the first target information, the target code is at least one of first codewords corresponding to the M first modes, one first mode corresponds to at least one first codeword, and the at least one first codeword includes at least one of the following: a mask, a phase rotation, and an orthogonal code.

Optionally, the target code is a first codeword corresponding to the third mode.

Optionally, the target code is related to priorities of the M first modes.

Optionally, as shown in FIG. 4, the receiving device 500 further includes:

an obtaining module 502, configured to obtain third information from the first sending device based on the first target resource, where the first target resource is used to indicate the third information of the first sending device, and the third information includes at least one of the following information: a synchronization source of the first sending device, a mode of the first sending device, a mode expected to be used by the first sending device, and a priority of the first sending device.

Optionally, the obtaining module 502 is further configured to obtain third information from the first sending device based on the second target sequence, where the second target sequence is used to indicate the third information of the first sending device, and the third information includes at least one of the following information: a synchronization source of the first sending device, a mode of the first sending device, a mode expected to be used by the first sending device, and a priority of the first sending device.

Optionally, the receiving module 501 is further configured to separately receive at least one piece of second target information from at least one second sending device on J second target resources, where one second target resource is related to at least one of the following of a second sending device corresponding to the second target resource: at least one fourth mode of the second sending device, K second synchronization sources found by the second sending device, and fifth information corresponding to the second sending device. The fifth information is used to indicate that the second sending device is within or outside coverage of a second target synchronization source. The second target synchronization source is at least one of the K second synchronization sources. The at least one fourth mode includes at least one of the following: a mode supported by the second sending device and a current mode of the second sending device. J and K are positive integers.

Optionally, as shown in FIG. 4, the receiving device 500 further includes:

a determining module 503, configured to determine a synchronization source of the receiving device based on a third target resource, where the third target resource is at least one of the first target resource and the J second target resources.

Optionally, the third target resource is related to priorities of G target modes, and the G target modes include at least one of the following: a target first mode corresponding to the first target resource and a target fourth mode corresponding to each second target resource in the J second target resources, where G is a positive integer.

Optionally, the third target resource is related to priorities of G target modes and a fourth rule, and the fourth rule is: selecting a resource of a target mode corresponding to a fourth target priority as the third target resource, where the fourth target priority is I highest priorities in the priorities of the G target modes, or S lowest priorities in the priorities of the G target modes, or a priority indicated by another device, or a preset priority in the priorities of the G target modes, where I and S are positive integers.

Optionally, as shown in FIG. 4, the receiving device 500 further includes:

a sending module 504, configured to determine third target information based on a fourth target resource, where the fourth target resource is at least one of the first target resource and the J second target resources.

Optionally, the fourth target resource is related to priorities of L target modes, and the L target modes include at least one of the following: a target first mode corresponding to the first target resource and a target fourth mode corresponding to each of the J second target resources, where L is a positive integer.

Optionally, the fourth target resource is related to priorities of L target modes and a fifth rule, and the fifth rule is: selecting a resource of a target mode corresponding to a fifth target priority as the fourth target resource, where the fifth target priority is H highest priorities in the priorities of the L target modes, or F lowest priorities in the priorities of the L target modes, or a priority indicated by another device, or a preset priority in the priorities of the L target modes, where H and F are positive integers.

Optionally, the priority of the target mode includes at least one of the following: a priority of the target mode when a corresponding sending device is a synchronization source, a priority of the target mode when a corresponding sending device schedules another device, a priority of the target mode when a corresponding sending device is scheduled, and a priority of the target mode when a corresponding sending device selects a sidelink resource.

Optionally, the sending module 504 is specifically configured to: if the receiving device is a related device in the target mode, skip sending a target signal sequence; or if the receiving device is a non-related device in the target mode, send the third target information based on the fourth target resource.

Optionally, a first resource of one first mode or one first synchronization source includes at least one of the following resources used to transmit corresponding first target information: a resource pool, a carrier, a BWP, a time domain resource, and a frequency domain resource.

Optionally, a second resource of one fourth mode or one second synchronization source includes at least one of the following resources used to transmit corresponding second target information: a resource pool, a carrier, a BWP, a time domain resource, and a frequency domain resource.

According to the receiving device provided in this embodiment of this application, after the receiving device receives the first target information on the first target information, because the first target resource is related to at least one of the indication information, the M first modes of the first sending device, and the N first synchronization sources found by the sending device, the receiving device can learn a device status of the sending device based on the first target resource, and no additional signaling interaction is required, thereby reducing signaling overheads and improving communication efficiency and effectiveness.

The receiving device provided in this embodiment of this application can implement the process in the foregoing method embodiment. To avoid repetition, details are not described herein again.

Figure 5:
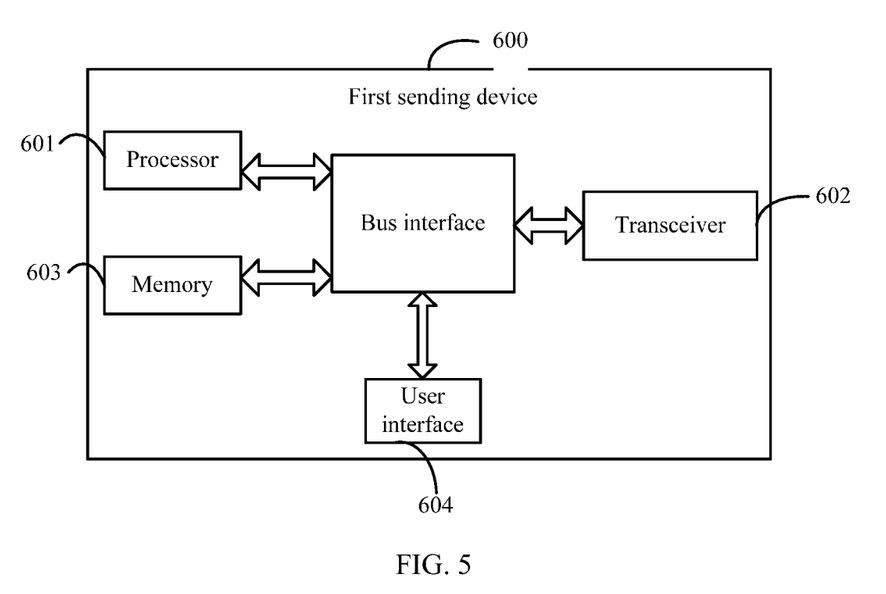
FIG. 5 is a schematic structural diagram 2 of a first sending device according to an embodiment of this application.

FIG. 5 is a schematic diagram of a hardware structure of a first sending device according to an embodiment of this application. The first sending device 600 includes a processor 601, a transceiver 602, a memory 603, a user interface 604, and a bus interface.

The transceiver 602 is configured to send first target information on a first target resource of the first sending device 600.

The first target resource is related to at least one of the following: M first modes of the first sending device 600, N first synchronization sources found by the first sending device 600, and indication information. The M first modes include at least one of the following: a second mode supported by the first sending device 600 and a current third mode of the first sending device 600. The indication information is used to indicate that the first sending device 600 is within or outside coverage of a first target synchronization source. The first target synchronization source is at least one of the N first synchronization sources. M and N are positive integers.

According to the sending device provided in this embodiment of this application, the sending device may send first target information on a selected first target resource. Because the first target resource is related to at least one of M first modes of the sending device (including at least one of a mode supported by the sending device and a current mode of the sending device) and N first synchronization sources found by the sending device, a receiving device can learn a device status of the sending device based on the first target resource, and no additional signaling interaction is required, thereby reducing signaling overheads and improving communication efficiency and effectiveness.

In this embodiment of the present invention, in FIG. 5, a bus architecture may include any quantity of interconnected buses and bridges, and is specifically linked by various circuits of one or more processors represented by the processor 601 and a memory represented by the memory 603. The bus architecture may further connect together various other circuits of a peripheral device, a voltage stabilizer, a power management circuit, and the like, which are known in this art and will not be further described herein. The bus interface provides an interface. The transceiver 602 can include a plurality of elements, namely a transmitter and a receiver, providing units in communication with various other devices on the transmission medium. For different user equipment, the user interface 604 may alternatively be an interface for externally and internally connecting a required device. The connected device includes, but not limited to, a keypad, a display, a loudspeaker, a microphone, a joystick, and the like. The processor 601 is responsible for bus architecture management and general processing. The memory 603 may store data used by the processor 601 when the processor 601 performs an operation.

In addition, the first sending device 600 further includes some function modules not shown, and details are not described herein.

Figure 6:
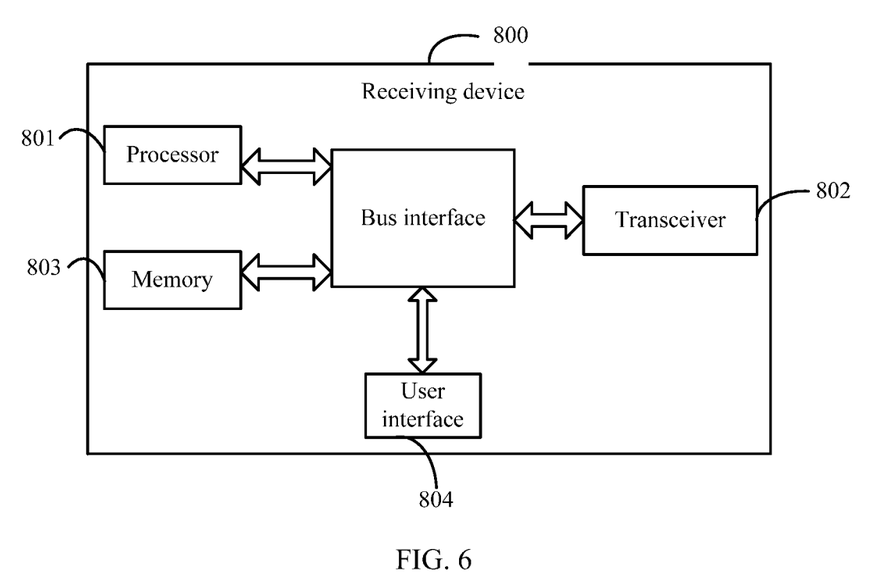
FIG. 6 is a schematic structural diagram 2 of a receiving device according to an embodiment of this application.

FIG. 6 is a schematic diagram of a hardware structure of a receiving device according to an embodiment of this application. The receiving device 800 includes a processor 801, a transceiver 802, a memory 803, a user interface 804, and a bus interface.

The transceiver 802 is configured to receive first target information from a first sending device on a first target resource. The first target resource is related to at least one of the following: M first modes of the first sending device, N first synchronization sources found by the first sending device, and indication information. The M first modes include at least one of the following: a second mode supported by the first sending device and a current third mode of the first sending device. The indication information is used to indicate that the first sending device is within or outside coverage of a first target synchronization source. The first target synchronization source is at least one of the N first synchronization sources. M and N are positive integers.

According to the receiving device provided in this embodiment of this application, after the receiving device receives the first target information on the first target information, because the first target resource is related to at least one of the indication information, the M first modes of the first sending device, and the N first synchronization sources found by the sending device, the receiving device can learn a device status of the sending device based on the first target resource, and no additional signaling interaction is required, thereby reducing signaling overheads and improving communication efficiency and effectiveness.

In this embodiment of the present invention, in FIG. 6, a bus architecture may include any quantity of interconnected buses and bridges, and is specifically linked by various circuits of one or more processors represented by the processor 801 and a memory represented by the memory 803. The bus architecture may further link various other circuits such as a peripheral device, a voltage regulator, and a power management circuit together. These are all well-known in the art, and therefore are not further described in this specification. The bus interface provides an interface. The transceiver 802 may include a plurality of elements, that is, include a transmitter and a receiver, and provide units for communication with various other apparatuses on a transmission medium. For different user equipment, the user interface 804 may further be an interface that can be externally or internally connected to a required device. The connected device includes but is not limited to a keypad, a display, a loudspeaker, a microphone, a joystick, and the like. The processor 801 is responsible for managing the bus architecture and common processing, and the memory 803 may store data used when the processor 801 performs an operation.

In addition, the receiving device 800 further includes some function modules not shown, and details are not described herein.

Optionally, an embodiment of this application further provides a sending device, including a processor, a memory, and a computer program that is stored in the memory and that can run on the processor. When the computer program is executed by the processor, the process of the information transmission method shown in the foregoing embodiment 1 is implemented, and a same technical effect can be achieved. To avoid repetition, details are not described herein.

Optionally, an embodiment of this application further provides a receiving device, including a processor, a memory, and a computer program that is stored in the memory and that can run on the processor. When the computer program is executed by the processor, the process of the information transmission method shown in the foregoing embodiment 1 is implemented, and a same technical effect can be achieved. To avoid repetition, details are not described herein.

An embodiment of this application further provides a computer-readable storage medium. A computer program is stored in the computer-readable storage medium. When being executed by a processor, multiple processes of the information transmission method in the foregoing method embodiments are implemented, and a same technical effect can be achieved. To avoid repetition, details are not described herein. The computer-readable storage medium includes a read-only memory (ROM for short), a random access memory (RAM for short), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal device (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of the present invention, and these forms all fall within the protection scope of this application.

The invention claimed is:

1. An information transmission method, applied to a first sending device, wherein the method comprises:
sending first target information on a first target resource of the first sending device; wherein
the first target resource is related to M first modes of the first sending device; and
the M first modes comprise at least one of the following: a second mode supported by the first sending device, and a current third mode of the first sending device, and M is a positive integers;
wherein the first target resource is at least one of first resources corresponding to the M first modes, and one first mode corresponds to at least one first resource;
wherein the first target resource is related to the priorities of the M first modes and a first rule, and the first rule is: selecting a first resource of a first mode corresponding to a first target priority as the first target resource of the first sending device; and
the first target priority is highest priorities in the priorities of the M first modes, or Y lowest priorities in the priorities of the M first modes, or a priority indicated by another device, or a preset priority, wherein X and Y are positive integers.

2. The method according to claim 1, wherein the sending first target information on a first target resource of the first sending device comprises:
sending a second target sequence on the first target resource of the first sending device; wherein
the first target information is carried on the second target sequence, or the first target information is carried on the second target sequence and a physical sidelink broadcast channel (PSBCH);
wherein the second target sequence is at least one of target signal sequences corresponding to the M first modes, and one first mode corresponds to at least one target signal sequence; and/or, the second target sequence is related to the indication information.

3. The method according to claim 2, wherein the second target sequence is used to indicate third information of the first sending device, and the third information comprises at least one of the following information: a synchronization source of the first sending device, a mode of the first sending device, a mode expected to be used by the first sending device, and a priority of the first sending device.

4. The method according to claim 1, wherein when M is a positive integer greater than 1, the sending first target information on a first target resource of the first sending device comprises:
sending, on the first target resource, first target information corresponding to some or all of the M first modes; wherein
the some or all of the first modes comprise a target first mode corresponding to the first target resource.

5. The method according to claim 1, wherein the sending first target information on a first target resource of the first sending device comprises:
sending a target signal on the first target resource based on a target code; wherein
the target signal carries the first target information, the target code is at least one of first codewords corresponding to the M first modes, one first mode corresponds to at least one first codeword, and the at least one first codeword comprises at least one of the following: a mask, a phase rotation, and an orthogonal code.

6. The method according to claim 5, wherein the target code is a first codeword corresponding to the third mode.

7. The method according to claim 5, wherein the target code is related to priorities of the M first modes, the method further comprises:
the target code being related to the priorities of the M first modes and a third rule, wherein the third rule is: selecting a first codeword of a first mode corresponding to a third target priority as the target code of the first sending device; and
the third target priority is C highest priorities in the priorities of the M first modes, or D lowest priorities in the priorities of the M first modes, or a priority indicated by another device, or a preset priority in the priorities of the M first modes, wherein and C and D are positive integers.

8. The method according to claim 1, wherein the first target resource is used to indicate third information of the first sending device, and the third information comprises at least one of the following information; a synchronization source of the first sending device, a mode of the first sending device, a mode expected to be used by the first sending device, and a priority of the first sending device.

9. A sending device, comprising: a processor, a memory, and a computer program that is stored in the memory and that can run on the processor, wherein when the computer program is executed by the processor, the processor is configured to implement following step:

sending first target information on a first target resource of the first sending device; wherein the first target resource is related to M first modes of the first sending device; and the M first modes comprise at least one of the following: a second mode supported by the first sending device, and a current third mode of the first sending device, and M is a positive integers;

wherein the first target resource is at least one of first resources corresponding to the M first modes, and one first mods, corresponds to at least one first resource;

wherein the first target resource is related to the priorities of the M first modes and a first rule, and the first rule is: selecting a first resource of a first mode corresponding to a first target priority as the first target resource of the first sending device; and the first target priority is X highest priorities in the priorities of the M first modes, or Y lowest priorities in the priorities of the M first modes, or a priority indicated by another device, or a preset priority wherein X and Y are positive integers.

10. A receiving device, comprising: a processor, a memory, and a computer program that is stored in the memory and that can run on the processor, wherein when the computer program is executed by the processor, the processor is configured to implement following step:

receiving first target information from a first sending device on a first target resource; wherein the first target resource is related to M first modes of the first sending device; and the M first modes comprise at least one of the following: a second mode supported by the first sending device, and a current third mode of the first sending device, and M is a positive integers;

wherein the first target resource is at least one of first resources corresponding to the M first modes, and one first mode corresponds to at least one first resource;

wherein the first tartlet resource is related to the priorities of the M first modes and a first rule, and the first, rule is: selecting a first resource of a first mode corresponding to a first target priority as the first target resource of the first sending device; and the first target priority is X highest priorities in the priorities of the M first modes, or Y lowest priorities in the priorities of the M first modes, or a priority indicated by another device, or a preset priority, wherein X and Y are positive integers.

11. The receiving device according to claim 10, wherein the receiving first target information from a first sending device on a first target resource comprises:

receiving a second target sequence from the first sending device on the first target resource; wherein the first target information is carried on the second target sequence, or the first target information is carried on the second target sequence and a physical sidelink broadcast channel (PSBCH);

the second target sequence is at least one of target signal sequences corresponding to the M first modes, and one first mode corresponds to at least one target signal sequence.

12. The receiving device according to claim 11, wherein the processor is further configured to implement:

obtaining third information from the first sending device based on the second target sequence; wherein the second target sequence is used to indicate third information of the first sending device, and the third information comprises at least one of the following information: a synchronization source of the first sending device, a mode of the first sending device, a mode expected to be used by the first sending device, and a priority of the first sending device.

13. The receiving device according to claim 10, wherein when M is a positive integer greater than 1, the receiving first target information from a first sending device on a first target resource comprises:

receiving, on the first target resource, first target information corresponding to some or all of the M first modes from the first sending device; wherein the some or all of the first modes comprise a target first mode corresponding to the first target resource.

14. The receiving device according to claim 10, wherein the receiving first target information from a first sending device on a first target resource comprises:

receiving a target signal from the first sending device on the first target resource; wherein the target signal is sent by the first sending device based on a target code, the target signal carries the first target information, the target code is at least one of first codewords corresponding to the M first modes, one first mode corresponds to at least one first codeword, and the at least one first codeword comprises at least one of the following: a mask, a phase rotation, and an orthogonal code.

15. The receiving device according to claim 14, wherein the target code is a first codeword corresponding to the third mode.

16. The receiving device according to claim 14, wherein the target code is related to priorities of the M first modes, the processor is further configured to implement:

obtaining third information from the first sending device based on the first target resource; wherein the first target resource is used to indicate third information of the first sending device, and the third information comprises at least one of the following information: a synchronization source of the first sending device, a mode of the first sending device, a mode expected to be used by the first sending device, and a priority of the first sending device.

17. The receiving device according to claim 10, wherein a first resource of one first mode or one first synchronization source comprises at least one of the following resources used to transmit corresponding first target information: a resource pool, a carrier, a bandwidth part BWP, a time domain resource, and a frequency domain resource.

* * * * *